(12) United States Patent  
Franaszek et al.

(10) Patent No.: US 6,842,832 B1  
(45) Date of Patent: Jan. 11, 2005

(54) RECLAIM SPACE RESERVE FOR A COMPRESSED MEMORY SYSTEM

(75) Inventors: Peter A. Franaszek, Mout Kisco, NY (US); Dan E. Poff, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 09/648,681

(22) Filed: Aug. 25, 2000

(51) Int. Cl.$^7$ .............................................. G06F 12/12
(52) U.S. Cl. ...................................... 711/159; 711/135
(58) Field of Search ................................ 711/159, 160, 711/133, 134, 135, 136; 707/101

(56) References Cited

U.S. PATENT DOCUMENTS

| | | | |
|---|---|---|---|
| 5,617,552 A | * | 4/1997 | Garber et al. .................. 341/51 |
| 5,696,927 A | * | 12/1997 | MacDonald et al. ........... 710/68 |
| 6,279,092 B1 | * | 8/2001 | Franaszek et al. ........... 711/170 |

* cited by examiner

Primary Examiner—Matthew D. Anderson
(74) Attorney, Agent, or Firm—Scully, Scott, Murphy & Presser; Derek S. Jennings

(57) ABSTRACT

A system and method for managing a memory storage device including a physical memory having free space for storing content maintained in compressed form and organized as pages. The system includes a control device for managing performance of input and output operations of compressed content to and from the memory storage device, with output operations including a memory pageout operations for recovering free memory storage space. The control device maintains an amount of free storage space readily available for recovery to above a threshold amount so as to enable subsequent pageout operations to be performed. A novel data construct is provided that includes locations of pages which may be immediately cleared from the physical memory for a subsequent pageout operation, the control device performing a flush operation by accessing the data construct and expediently deleting one or more pages identified in the list as available for deletion. With this data construct and flush operation, the threshold amount for free storage space recovery is able to be significantly reduced.

28 Claims, 5 Drawing Sheets

RECLAIM SPACE RESERVE FOR A COMPRESSED MEMORY SYSTEM

BACKGROUND OF THE INVENTION

1. Field of the Invention

This present invention relates generally to computer operating systems and in particular, the implementation of a system and method for reducing the amount of free physical space that needs to be reserved in a system which incorporates a compressed main memory.

2. Discussion of the Prior Art

FIG. 1(a) depicts one example of a block diagram of a computing system 100 incorporating a compressed memory management capability. The computing system 100 includes, for example, one or more processors 102, operating system 125, a cache 104, a compression controller 106, compressed main memory 108 and one or more input/output ("I/O") devices 110, each of which is described in detail below.

As is known, processor(s) 102 are the controlling center of the computing system 100. The processor(s) 102 execute at least one operating system ("OS") (125) which controls the execution of programs and processing of data. Examples include, but are not limited to, an OS such as that sold under the trademark AIX by International Business Machines ("IBM") Corporation and an OS sold under the trademark WINDOWS NT by the Microsoft Corporation. As will be described below, the operating system 125 is one component of the computing environment 100 that can incorporate and use the capabilities of the present invention.

Coupled to the processor(s) 102 and the compression controller 106 (described below), is a cache memory 104. The cache memory 104 provides a short term, high-speed, high-capacity computer memory for data retrieved by the compression controller 106 from the I/O devices 110 and/or the compressed main memory 108.

Coupled to the cache 104 and the compressed memory 108 is the compression controller 106, (described in detail below) which manages, for example, the transfer of information between the I/O devices 110 and the cache 104, and/or the transfer of information between the compressed main memory 108 and the cache 104. Functions of the compression controller include the compression/decompression of data; and the storing of the resulting compressed lines in blocks of fixed size. This preferably includes a mapping from real page addresses, as seen by the operating system, to addresses of fixed-size blocks in memory 108.

The compressed main memory 108, which is also coupled to the compression controller 106, contains data which is compressed, for example, in units of cache lines. In one embodiment, each page includes four cache lines. Cache lines are decompressed and compressed respectively when inserted or cast-out of cache 104. Pages from I/O devices 110 are also compressed (in units of cache liens) on insertion into main memory 108. In this example, I/O is done into and out of the cache 104. Although a single cache is shown, for simplicity, an actual system may include a hierarchy of caches.

As is well known, information relating to pages of memory can be stored in one or more page tables in the main memory or the cache 104 and is used by the OS 125. One example of a page table 140 is depicted in FIG. 1(b). Page table 140 includes a plurality of page table entries 142 and each entry includes, for instance, a virtual address 144 for a given page; a real address 146 corresponding to the virtual address for that page; and a set of management information 148 for the page, for example, a use bit field indicating whether the page has been referenced and a read/write or read-only access field indicating the allowed type of access.

The real address of a page is mapped into a set of physical addresses (e.g., identifiers of blocks of storage) for each cache line, when the page is requested from main memory 108. In one example, this is accomplished using tables 150 and 160, illustrated in FIG. 1(c). These tables can be stored in the compression controller 106. Table 150 includes, for instance, what is termed the real page address for a page, Page (i), as well as a list of the memory blocks for each line of the page. For example, each page could be 4 k bytes in size and includes four cache lines. Each cache line is 1 k bytes in size.

Compressed cache lines are stored in fixed-size blocks of 256 bytes, as one example. Table 160 includes, for instance, the compressed blocks making up a particular line of Page (i). For example, line 1 of Page (i) includes three compressed blocks, each having 256 bytes. Since, in this example, each page can include up to four cache lines and each cache line can include up to four compressed blocks of memory, each page may occupy up to 16 blocks of memory.

Referring again to the system depicted in FIG. 1(a), the compression controller 106 may include one or more interrupt registers 120 and a free-space list 112. One implementation of the free-space list is as a linked list, which is well known to those of skill in the art.

Here, the compression controller 106 performs various functions, including:

a) compressing lines which are cast out of the cache 104, and storing the results in some number of fixed-size blocks drawn from the free-space list 112;

b) decompressing lines on cache fetches;

c) blocks freed by operations such as removing a line from memory, or compressing a changed line which now uses less space, are added to the free-space list 112;

d) maintaining a count F of the number of blocks on the free-space list 112. This count is preferably available to the OS 125 on request; and e) maintaining a set of thresholds implemented as interrupt registers (120) on the size of F. Changes in F that cause thresholds to be crossed cause a processor interrupt. Preferably, each threshold can be dynamically set by software and at least those related to measured quantities are stored in an interrupt register 120 in the controller 106.

As further shown in FIG. 1(a), the free-space manager 130 maintains an appropriate number of blocks on the free-space list 112. Too few such blocks causes the system to abend or suspend execution of applications pending page-outs, while having too many such blocks is wasteful of storage, producing excessive page faults. The free-space manager also sets the interrupt registers 120 with one or more thresholds (T0 . . . TN) at which interrupts are generated. Threshold values which are related to actual measured values, as opposed to periodically measured values, are stored in one or more interrupt registers 120. Examples of thresholding policies and control processes are described in detail in commonly-owned, co-pending U.S. Patent Application No. 09/021,338 (YO997-338), entitled COMPRESSION STORE FREE-SPACE MANAGEMENT, the whole contents and disclosure of which are incorporated herein by reference. Further shown in FIG. 1(a) is the presence of Reclaim list 134 having pages which represent page frames that may be used immediately upon request by the operating system since a valid copy of every page on the reclaim list exists on disk.

A solution to the requirement for additional space when performing pageouts is to maintain sufficient amounts of free physical space. However, this can be quite wasteful of physical storage, since the required pageouts may involve substantial traversals of large objects such as page tables, whose worst case expansion needs to be accounted for. This is considered memory in a used but available state.

For instance, with respect to the computer system 100 implementing a shared cache memory as illustrated in FIG. 1($a$), the controller device 106 is configured to maintain a count "F" having a value representing the amount of free space available to the computer operating system. Generally, F must be sufficient to permit pageouts to be performed which amount of space is denoted as a number $F^*$. If F decreases below a threshold T1, where $T1>=F^*$, the memory controller issues an interrupt to the processor. This interrupt stops normal processing and initiates the recovery of free space by deleting or paging out to disk a sufficient number of pages to increase the amount of free space available to above a second threshold T2. Generally the reserve represented by T1 can be quite large, representing a substantial amount of unused and thus wasted space.

It would thus be highly desirable to provide a system and method for reducing the amount of reserve space required for performing pageouts to disk.

It would further be highly desirable to provide a system and method for reducing the amount of reserve space required for performing pageouts by keeping much of the reserve in a set of pages which can be deleted by the interrupt handler, but which may also be referenced and used by the system.

It would additionally be highly desirable to provide a system and method for reducing the amount of reserve space required for performing pageouts to disk and enabling pageouts to be performed without the need for a general traversal of page tables and paging I/O.

SUMMARY OF THE INVENTION

It is an object of the present invention to reduce the amount of physical space that needs to be held in reserve so as to permit pageouts to be performed when there is a shortage of reserve space.

It is a further object of the present invention to provide, in a compressed memory system, a mechanism for rapidly recovering from a compression-decompression overload, i.e., rapidly clearing space and for recovering pages.

It is another object of the present invention to provide, in a compressed memory system, a system and method for reducing the amount of reserve space required for performing a pageout operation by keeping much of the reserve in a set of pages which can be deleted by the interrupt handler, and which may also be referenced and used by the system.

It is still another object of the invention to provide, in a compressed memory system, a system and method for reducing the amount of reserve space required for performing a pageout operation and enabling pageouts to be performed without the need for a general traversal of page tables and paging I/O.

According to the invention, there is provided a system and method for managing a memory storage device including a physical memory having free space for storing content maintained in compressed form and organized as pages. The system includes a control device for managing performance of input and output operations of compressed content to and from the memory storage device, with output operations including a memory pageout operations for recovering free memory storage space. The control device maintains an amount of free storage space readily available for recovery to above a threshold amount so as to enable subsequent pageout operations to be performed. A novel data construct is provided that includes locations of pages which may be immediately cleared from the physical memory for a subsequent pageout operation, the control device performing a flush operation by accessing the data construct and expediently deleting one or more pages identified in the list as available for deletion. With this data construct and flush operation, the threshold amount for free storage space recovery is able to be significantly reduced.

Advantageously, the novel data construct is a special software construct comprising the list of pages which may be immediately cleared, thus avoiding the need for a general traversal of page tables and paging I/O.

The structure of the novel data construct is such that although normal access (when shortage of space is not at issue) for purposes of updating requires obtaining an operating system lock, the list of pages may be traversed (when shortage of space is an issue) and pages eliminated from the physical storage without first obtaining a lock. Another requirement is that the structure itself be accessible during interrupt handling or via service processor, independently of virtual memory list management.

Further, the structure of the novel data construct is such that it is maintained in a state where it is guaranteed to hold a list of sufficient pages to represent adequate storage for recovery to normal operation. Thus, when pages are eliminated from the list during memory shortages, an objective of the operating system, before resuming normal operation, is to add to this list of adequate pages for the next recovery.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 1($b$) illustrates an example page table structure.

FIG. 1($c$) illustrates an example organization of physical addresses of pages of compressed main memory.

FIG. 4($b$) is an illustrative depiction of the system methodology regarding a FLUSH outlist operation 300 according to the principles of the invention.

FIG. 4($c$) is an illustrative depiction of the system methodology regarding a SWEEP outlist operation 400 according to the principles of the invention.

DETAILED DESCRIPTION OF THE INVENTION

Figure 1A:
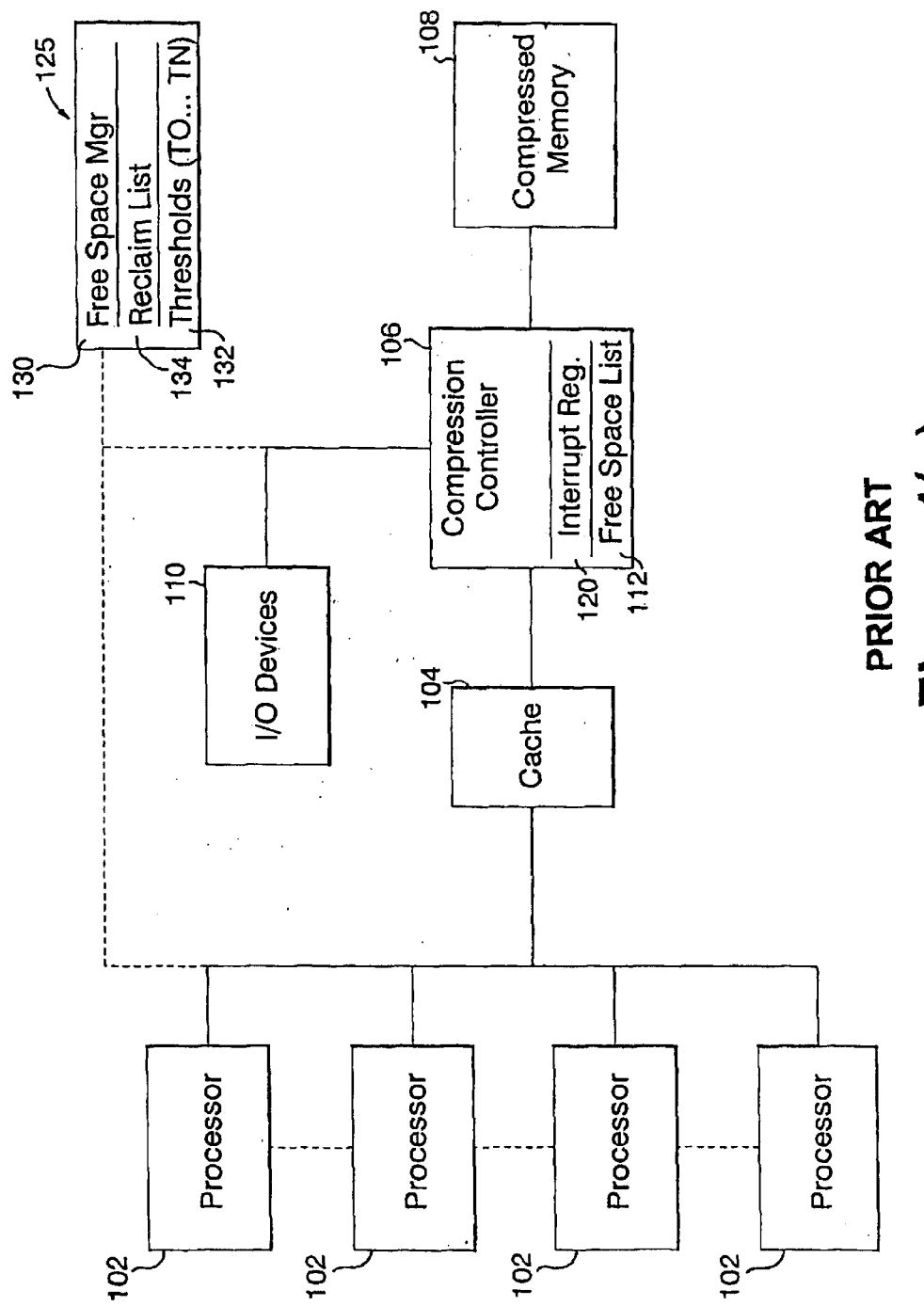
FIG. 1($a$) illustrates an example computing environment 100 incorporating and using the memory management capability according to the principles of the invention.
Figure 1B:
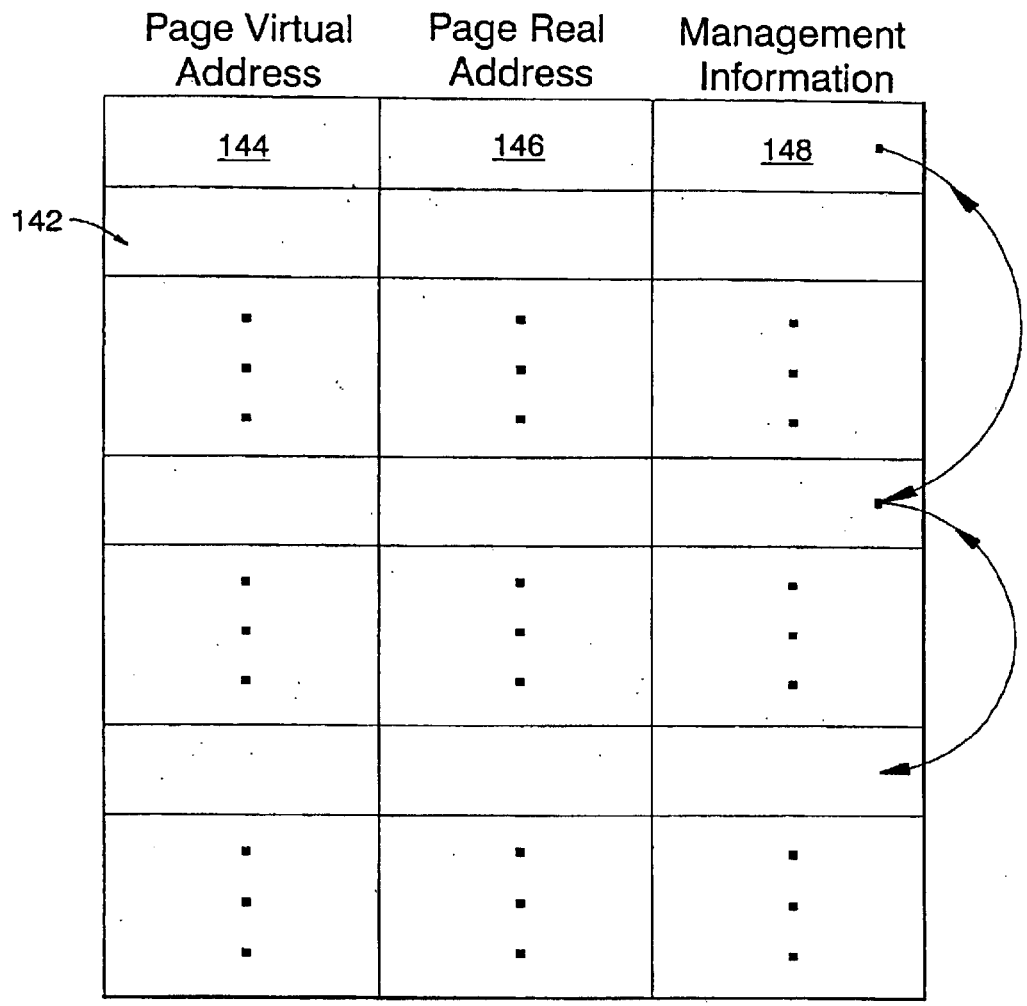
Figure 1C:
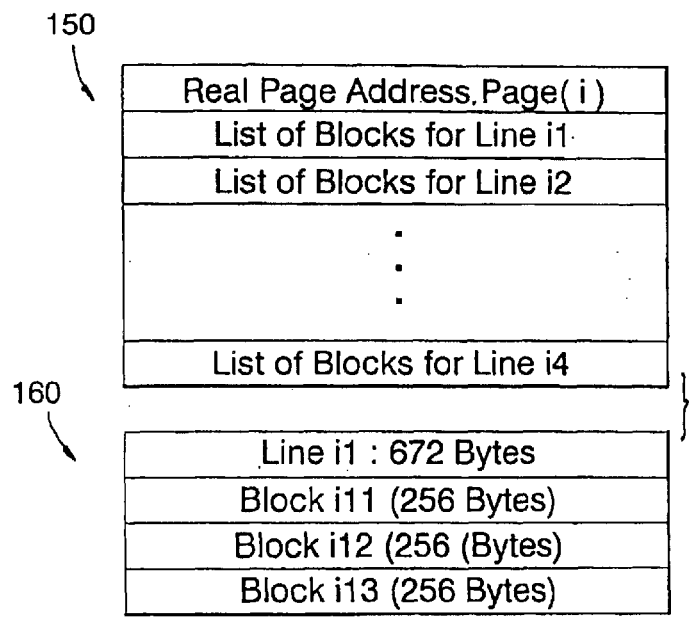

In accordance with the invention, a special software construct, referred to herein as the "outlist", is provided and maintained by the operating system 125 in FIG. 1(a) and comprises a list of pages which may be immediately cleared, thus avoiding the need for a general traversal of page tables and paging I/O. A requirement of the outlist structure is that it itself can be accessed during interrupt handling or via a service processor, independently of virtual memory list management.

Preferably, the outlist structure itself occupies little memory space, and thus may be traversed and processed without requiring much reserve space. That is, provision of the outlist structure results in a substantial reduction of the aforementioned threshold T1, with the requirement being as follows:

$$T1 < F^* F0 + F1$$

where F0 is the amount of space held by pages on the outlist; F1 is the amount of space that needs to be reserved for traversing and processing the outlist; and F* is the determined amount of memory space needed for permitting pageouts to be performed.

Figure 2:
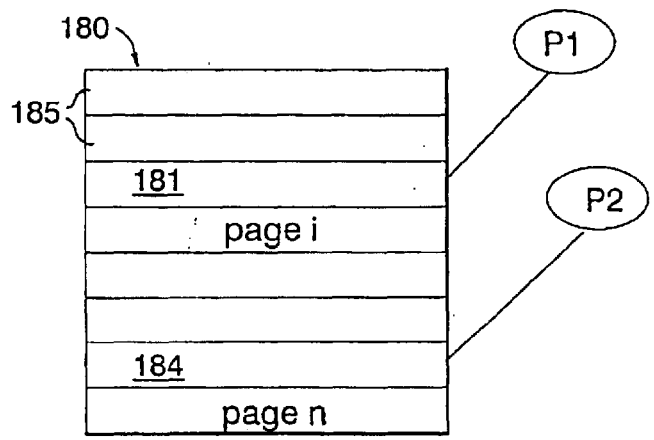
FIG. 2 illustrates an outlist table 200 comprising the list of pages for physical space recovery.

FIG. 2 illustrates conceptually the outlist structure 180 which preferably comprises a hash table 180 having a set of N pages with contiguous virtual addresses. As shown in FIG. 2, pages on the outlist 180 are represented as entries 185 in the hash table, each entry 185 comprising a location. As is standard with a hash list, an entry for a given page may be found by hashing on its address to obtain an entry point in the hash table. In the case of a collision (a different page has been entered in this position), the items are examined in order of ascending addresses modulo R, where R is the number of places on the list, until the desired page (or a space for a page) is found. The presence of a page in the outlist is noted in its entry in the operating system page tables.

Figure 3:
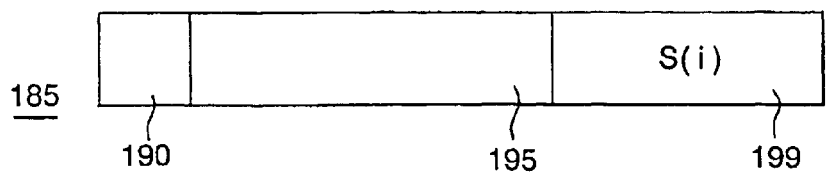
FIG. 3 illustrates the contents of an outlist table entry 250 according to the invention.

FIG. 3 shows an entry 185 in the hash table 180 as including a field 190 containing a "presence" bit flag indicating the presence of the page for flush operations, as will be described in greater detail herein; a page ID field 195 indicating the current page; and, a field 199 indicating the physical space S(i) that the page occupies, i.e., outlist space.

Preferably, as will be described in detail with respect to FIGS. 4(a)–4(c), there are three respective operations that may be performed on the outlist. These are: 1) NORMAL: normal additions and deletions of pages on the outlist wherein, as a page is entered into the outlist, the amount of physical space it occupies is added to the total physical space occupied by items on the list; and, conversely, as a page is deleted from the outlist, the amount of physical space it occupies is subtracted from the total physical space occupied by items on the list; 2) FLUSH: deletion of pages from outlist by an interrupt handler, to recover space; and, 3) SWEEP: before normal operation is resumed, updating page tables to reflect the deletion of pages performed by the FLUSH operation. Referring back to FIG. 2, during normal system operation a pointer P is maintained that indicates the location in the hash table 180. Pointer entry P1, for example, indicates the most recent page 181 that was eliminated during a flush operation. A second pointer entry, indicated as pointer P2, indicates the last page 184 that was eliminated.

Items may be added or deleted from the hash table 180 during NORMAL operation. For example, a page 185 on the table may be referenced, and thus moved into a working set. Whenever a page, "Vi" is removed, the quantity F0 is lowered by the amount of physical space occupied which is denoted by S(i). If F0 is too low, i.e. below the threshold T1, additional pages are placed on the list and F0 adjusted until F0>T1.

The outlist data construct is such that normal access (when shortage of space is not at issue) for purposes of updating requires obtaining an operating system lock. That is, in order to avoid inconsistencies when more than one OS thread wishes to modify the outlist simultaneously only one normal thread is allowed to be active, and the lock is acquired for each page entry or deletion. This is controlled by requiring this thread to hold a lock on the hash table. However, in the preferred embodiment, the list of pages may be traversed (when shortage of space is an issue) and pages eliminated from the physical storage for a FLUSH operation without first obtaining a lock. That is, the thread may be interrupted via flush processing. Thus a page being entered may be eliminated by the flush operation before the entry is complete. Preferably, to avoid this inconsistency, the operation to enter or remove a page entered into "Vi", with "Vi" representing the ID of the page most recently added or deleted and occupying S(i) physical space, is described with respect to FIG. 4(a).

Figure 4A:
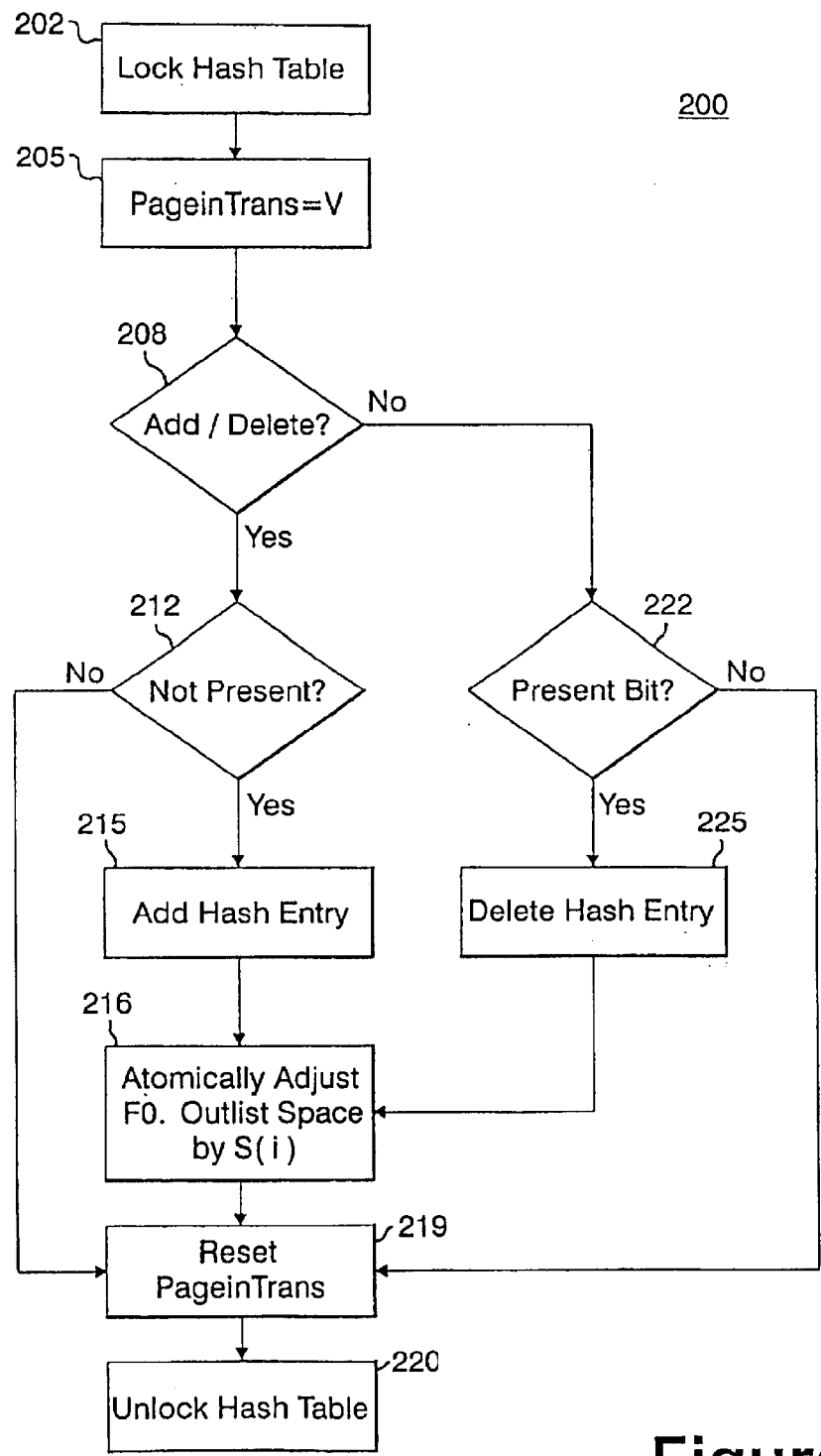
FIG. 4($a$) is an illustrative depiction of the system methodology regarding NORMAL outlist operations 200 according to the principles of the invention.

FIG. 4(a) is a flow chart depicting the NORMAL outlist operations 200. In FIG. 4(a), to enter or remove a page to/from the hash table, there is required the first step 202 of obtaining a lock on the hash table. Then, at step 205, a PageInTrans' system variable is assigned the page ID "V" indicating this page is in transition. This variable is provided in order to prevent deletion of this page should the addition/deletion operation be interrupted due to invocation of a flush operation interrupt. At page 208, a decision is made as to whether the referenced page is to be added or deleted. For the case of a page to be added, a check is made as to the state of the "presence bit", as indicated at step 212. If the present bit is not set, then the Hash table entry is added at step 215. Furthermore, at step 216, an adjustment of the amount of space held by pages on the outlist, i.e., F0, is performed, by performing a compare & swap operation to augment F0 by the physical space amount S(i) that the page occupies. If at step 212, it is determined that bit is already present, then the process continues to step 219 in order to reset the PageInTrans variable and terminate the operation. At this point, the hash table is unlocked at step 220. If the compare is a negative (indicating that there has been a flush) then the operations of either adding or deleting a page entry at step 208 et seq, are repeated.

Returning to step 208, FIG. 4(a), if the referenced page is to be deleted, a check is made as to the state of the "presence bit", as indicated at step 222. If the present bit has been set, then the Hash table entry is deleted at step 225. The process then proceeds step 216, where an adjustment of the amount of space held by pages on the outlist, i.e., F0, is performed, by performing a compare & swap operation to decrement F0 by the physical space amount S(i) that the page deleted occupied. If at step 222, it is determined that bit is not already present, then the process continues to step 219 in order to reset the PageInTrans variable and terminate the operation. At this point, the hash table is unlocked at step 220. It should be understood that if the compare is a negative (indicating that there has been a flush) then the operations of either adding or deleting a page entry at step 208 et seq. are repeated.

It is understood that the 'compare & swap' is the atomic operation, such as shown at step 216 in FIG. 4(a). As mentioned, if the compare is negative (there has been a flush) then process is repeated.

Figure 4B:
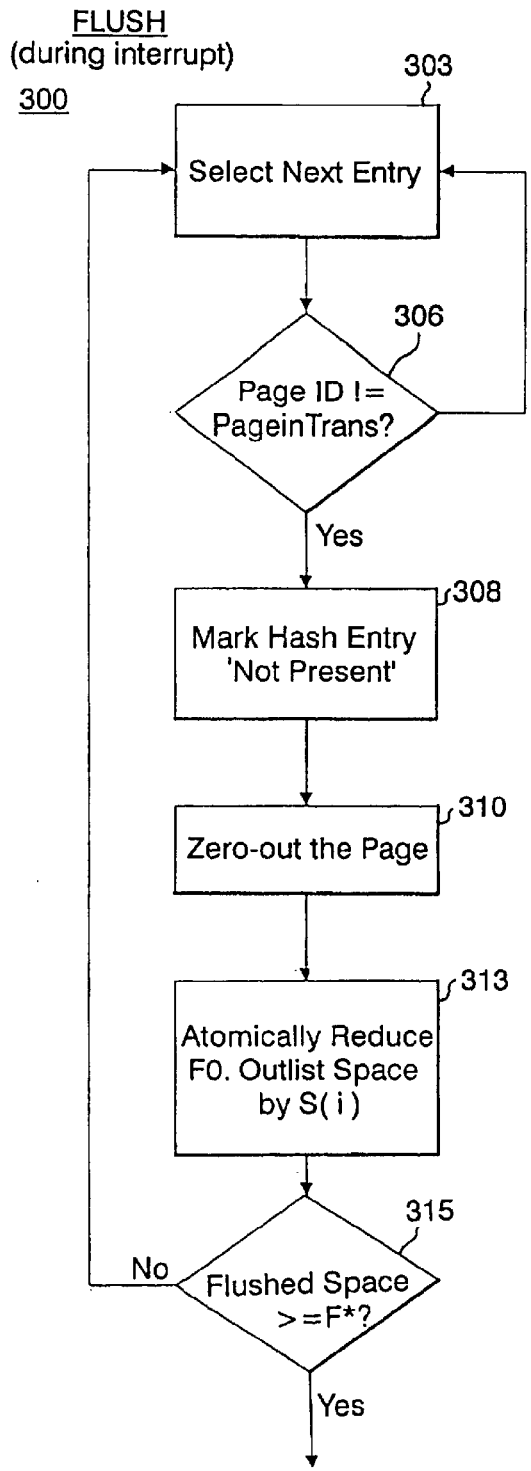
Figure 4C:
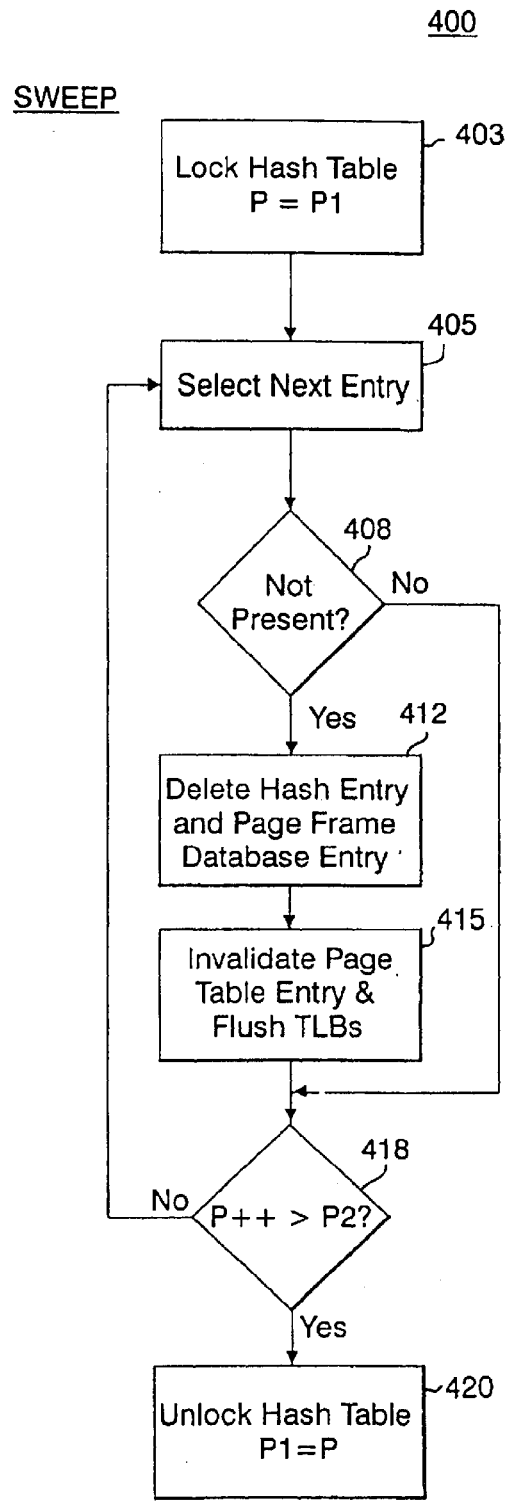

FIG. 4(b) is a flow diagram depicting the particulars of a system FLUSH operation 300 which occurs during an interrupt. Essentially, during normal operation, if an interrupt is received to start the flush operation, pages at locations (P1+i) mod R, where i=1, 2, . . . , with the exception of V, are eliminated, and their presence bits set to zero at step 157. Additionally, as will be described in greater detail herein, the quantity F0 is adjusted. This continues until F0 is lowered by an amount "delta," which is the amount of free space judged sufficient to restart the operating system (OS). The last page eliminated is at location P2.

As shown at a first step 303, FIG. 4(*b*), the next entry is selected, and, at step 306, a decision made as to whether the PageID is not equal to the PageInTrans (transition page). If the PageID is not equal to the PageInTrans variable, then at step 308, the hash entry 'presence bit' is marked as not available and the page is zeroed at step 310. Then, at step 313, an adjustment of the amount of space held by pages on the outlist, i.e., F0, is performed, by performing a compare & swap operation and adjusting F0 by the physical space amount S(i) that the page occupied. Proceeding to step 315, a determination is then made as to whether the flushed space is greater or equal to the F* amount of memory space needed for permitting pageouts to be performed. If at step 315, it is determined that the flushed space is greater or equal to the F* amount of memory space needed for permitting pageouts to be performed, then the process terminates and proceeds to a sweep operation. If, at step 315, it is determined that the flushed space is not greater or equal to the required F* amount, then, the process returns to step 303 in order to select the next entry from the hash table for the flush operation. The process steps 303–315 repeats until the condition of step 315 holds true.

In the preferred embodiment, the operating system maintains a 'page frame database', which describe the states of pages held in memory. A page which is held in the outlist according to the invention will have a corresponding bit set in the page frame database. If it is referenced, it will generally be desirable to remove it from the outlist, using the operations described herein. Then if the amount of space held by pages on the outlist falls below a threshold, more pages are added to this list.

FIG. 4(*c*) depicts the SWEEP operation 400 which occurs before resumption of normal operation after a FLUSH operation. In this procedure, page tables are updated to reflect the deletion of pages as a result of a FLUSH. Particularly, the OS obtains a lock to the hash table, sweeps all entries between page location pointed to by pointers P1 and P2, erases entries with presence bits set to zero, and adjusts its page tables accordingly by adding sufficient entries to the table to satisfy the space reserve requirements. When this is complete, normal system operation is resumed. In greater detail, as shown at a first step 403 in FIG. 4(*c*), the first step is to obtain a lock on the hash table and set the pointer P equal to the first page P1, i.e., the most recent page that was eliminated during a flush operation. Then, at step 405, a next entry is selected, and, at step 408, a decision made as to whether the Presence Bit is set. If the presence bit for the selected page is not set, i.e., is equal to "0", then the process proceeds to step 412 where the hash entry and the page frame database entries are deleted. The page table entry and flush tables are then invalidated at step 415. Returning back to step 408, if the Presence Bit has been set, i.e., if it is marked for a flush operation, then the process continues to step 418 where the pointer value P is incremented and a determination made as to whether P is greater than P2, i.e., the last page that was eliminated during the FLUSH operation. If the value P is not yet greater than the value P2, then the process loops back to step 405 where the next entry in the hash table is selected, and proceeds steps 408–418 repeated. The process steps 405–418 are repeated until at the step 418, FIG. 4(*c*), it is determined that pointer P is greater than P2. When this condition holds, then the process proceeds to step 420 to unlock the hash table and again set the new pointer value P is set equal to P1.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for managing a memory storage device including a physical memory having free space for storing content maintained in compressed form, said compressed memory content organized as pages in said memory storage device, said system comprising:

a control device for managing performance of input and output operations of compressed content to and from said memory storage device, said output operations including a memory pageout operations for free memory storage space recovery, said control device maintaining an amount of free storage space readily available for recovery to above a threshold amount so as to enable subsequent pageout operations to be performed;

a data construct comprising a list of locations of pages which may be immediately cleared from said physical memory for a subsequent pageout operation, said control device performing a flush operation by accessing said data construct and expediently deleting one or more pages identified in said list, whereby said threshold amount for free storage space recovery is reduced by enabling said expedient deletion enabled by said data construct independently of virtual memory list management.

2. The system as claimed in claim 1, whereby said flush operation a pageout operation requires operating system thread traversal of page tables that map virtual memory addresses issued by a processor device to page locations in said physical memory that are to be deleted for free space recovery, said system avoiding need of said page table traversal for said flush operation.

3. The system as claimed in claim 1, wherein said system includes mechanism for determining shortage of free recovery space and, in response to determination of immediate need of free storage space recovery required for a pageout, said mechanism generating an interrupt to enable operating system access to said data and initiating temporary suspension of code executing operations performed by a processor device.

4. The system as claimed in claim 3, wherein said data construct comprises a hash table having a table entry list, each said table entry including:

a page identifier for locating said page in said physical memory; and, an associated amount of physical space occupied by said page, wherein said data construct maintains a total physical space occupied by all items on said list.

5. The system as claimed in claim 4, wherein said data construct further comprises a bit indicating availability of said page to be recovered from or added to said physical memory storage, said control device setting bits associated with respective pages to be expediently deleting during said flush operation.

6. The system as claimed in claim 4, wherein, said control device further includes device for adjusting said total physical space for accommodating subsequent pageout operations during normal system operation, said adjusting including accessing said data construct for adding table entries thereto or deleting table entries therefrom, wherein a physical space occupied for each entered page is added to said total physical space, and, a physical space occupied for each deleted page is deleted from said total physical space.

7. The system as claimed in claim 6, further including lock mechanism for enabling single operating system thread access to said data construct for normal system operation, said interrupt handling mechanism overriding operating system thread access to said data construct to enable said flush operation.

8. The system as claimed in claim 7, further including mechanism for identifying a new page entered into said data construct as a page in transition, said control device checking for identified new page in transition in order to avoid expedient deletion of said new pages.

9. The system as claimed in claim 6, further comprising tracking pointer mechanism for maintaining a first pointer to a location of a most recent page eliminated during a flush operation and, for maintaining a second pointer to a location of a last page eliminated during expedient deletion operation.

10. The system as claimed in claim 9, further comprising sweep mechanism for deleting entries in said data construct list after said flush operation, said deleted entries including those entries between said first pointer and second pointer locations and having said availability bits set.

11. A method for managing a memory storage device including a physical memory having free space for storing content maintained in compressed form, said compressed memory content organized as pages in said memory storage device, said method comprising the steps of:

a) maintaining an amount of free memory storage space readily available for recovery to above a threshold amount, said threshold amount of free memory storage space recovery for enabling an operating system to perform memory pageout operations;

b) accessing a data construct comprising a list of locations of pages which may be immediately cleared from said physical memory for a subsequent pageout operation; and, c) performing a flush operation by expediently deleting one or more pages identified in said list independently of virtual memory list management.

12. The method as claimed in claim 11, wherein prior to step b), performing a step of determining shortage of free memory recovery space for a pageout operation; and, in response to determining immediate need of free storage space recovery required for a pageout, the steps of:

generating an interrupt to enable operating system access to said data; and, initiating temporary suspension of code executing operations performed by a processor device.

13. The method as claimed in claim 12, wherein said data construct comprises a hash table having a table entry list, each said table entry including:

a page identifier for locating said page in said physical memory; and, an associated amount of physical space occupied by said page, said maintaining step a) including the step of maintaining a total physical space occupied by all items on said list.

14. The method as claimed in claim 13, wherein said data construct further comprises a bit indicating availability of said page to be recovered from or added to said physical memory storage, said maintaining step a) further including the step of setting bits associated with respective pages to be expediently deleting during said flush operation.

15. The method as claimed in claim 14, wherein said maintaining step a) further includes step of adjusting said total physical space for accommodating subsequent pageout operations during normal system operation, said adjusting including:

i) accessing said data construct for adding table entries thereto or deleting table entries therefrom; and, ii) respectively, adding a corresponding amount of physical space occupied for each entered page to said total physical space, or, deleting from said total physical space a corresponding amount of physical space occupied by each deleted page.

16. The method as claimed in claim 15, further including the step of providing lock mechanism for enabling single operating system thread access to said data construct for normal system operation, said lock mechanism overriding operating system thread access to said data construct to enable said flush operation.

17. The method as claimed in claim 16, further including the step of:

identifying a new page entered into said data construct as a page in transition; and, preventing expedient deletion of said pages identified as pages in transition during said flush operation.

18. The method as claimed in claim 15, further comprising the steps of:

maintaining a first pointer to a location of a most recent page eliminated during a flush operation and, maintaining a second pointer to a location of a last page eliminated during expedient deletion operation.

19. The method as claimed in claim 18, wherein after said flush operation, the step of: deleting entries between said first pointer and second pointer locations and that have said availability bits set.

20. A program storage device readable by a machine, tangibly embodying a program of instructions executable by the machine to perform method steps for managing a memory storage device including a physical memory having free space for storing content maintained in compressed form, said compressed memory content organized as pages in said memory storage device, said method steps including the steps of:

a) maintaining an amount of free memory storage space readily available for recovery to above a threshold amount, said threshold amount of free memory storage space recovery for enabling an operating system to perform memory pageout operations;

b) accessing a data construct comprising a list of locations of pages which may be immediately cleared from said physical memory for a subsequent pageout operation; and, c) performing a flush operation by expediently deleting one or more pages identified in said list independently of virtual memory list management.

21. The program storage device readable by a machine as claimed in claim 20, wherein prior to step b), performing a step of determining shortage of free memory recovery space for a pageout operation; and, in response to determining immediate need of free storage space recovery required for a pageout, the steps of:

generating an interrupt to enable operating system access to said data; and, initiating temporary suspension of code executing operations performed by a processor device.

22. The program storage device readable by a machine as claimed in claim 21, wherein said data construct comprises a hash table having a table entry list, each said table entry including:

a page identifier for locating said page in said physical memory; and, an associated amount of physical space occupied by said page, said maintaining step a) including the step of maintaining a total physical space occupied by all items on said list.

23. The program storage device readable by a machine as claimed in claim 22, wherein said data construct further comprises a bit indicating availability of said page to be recovered from or added to said physical memory storage, said maintaining step a) further including the step of setting bits associated with respective pages to be expediently deleting during said flush operation.

24. The program storage device readable by a machine as claimed in claim 23, wherein said maintaining step a) further includes step of adjusting said total physical space for accommodating subsequent pageout operations during normal system operation, said adjusting including:

i) accessing said data construct for adding table entries thereto or deleting table entries therefrom; and, ii) respectively, adding a corresponding amount of physical space occupied for each entered page to said total physical space, or, deleting from said total physical space a corresponding amount of physical space occupied by each deleted page.

25. The program storage device readable by a machine as claimed in claim 24, further including the step of providing lock mechanism for enabling single operating system thread access to said data construct for normal system operation, said lock mechanism overriding operating system thread access to said data construct to enable said flush operation.

26. The program storage device readable by a machine as claimed in claim 25, further including the step of:

identifying a new page entered into said data construct as a page in transition; and, preventing expedient deletion of said pages identified as pages in transition during said flush operation.

27. The program storage device readable by a machine as claimed in claim 24, further comprising the steps of:

maintaining a first pointer to a location of a most recent page eliminated during a flush operation and, maintaining a second pointer to a location of a last page eliminated during expedient deletion operation.

28. The program storage device readable by a machine as claimed in claim 27, wherein after said flush operation, the step deleting entries between said first pointer and second pointer locations and that have said availability bits set.

* * * * *